Sept. 12, 1939. F. L. LONGWELL ET AL 2,173,021
WINDSHIELD WASHER AND WIPER
Filed Aug. 2, 1938
*Fig. 2.* *Fig. 3.*
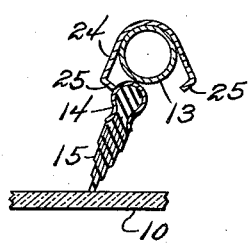 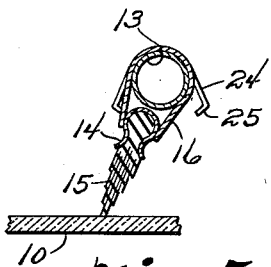
*Fig. 4.* *Fig. 5.*
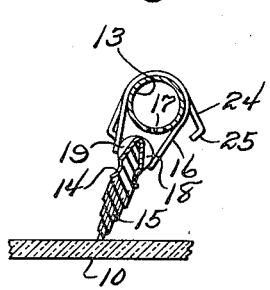 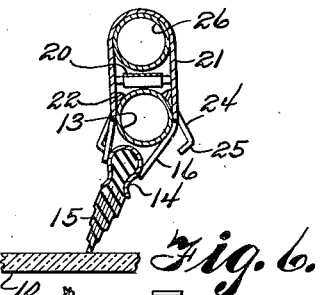
*Fig. 1.* *Fig. 6.*
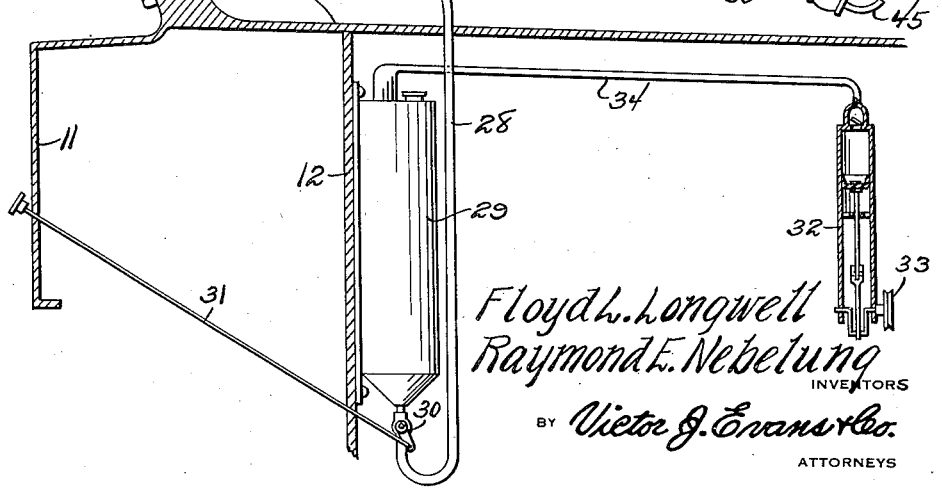
Floyd L. Longwell
Raymond E. Nebelung
INVENTORS
BY Victor J. Evans & Co.
ATTORNEYS Patented Sept. 12, 1939

2,173,021

UNITED STATES PATENT OFFICE 2,173,021

WINDSHIELD WASHER AND WIPER

Floyd L. Longwell, Phoenix, Ariz., and Raymond E. Nebelung, Oakland, Calif.

Application August 2, 1938, Serial No. 222,720

1 Claim. (Cl. 15—250)

This invention relates to a windshield washer and wiper and has for an object to provide a device of this type which will enable the driver of a motor vehicle to wash and dry the area of the windshield covered by the windshield wiper, and control such operation from his driver's position at any time whether the vehicle is stationary or in motion, and without interfering with the driver's operation of the vehicle.

A further object is to provide a spray tube carried as a unit with the windshield wiper blade and having outlet openings arranged to deliver water or other cleaning fluid upon the windshield in front of the wiper blade in both directions of the oscillatory movement of the blade.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view of a portion of a motor vehicle including the windshield and dash, and showing in side elevation a windshield washer and wiper constructed in accordance with the invention.

Figure 2 is a cross sectional view taken on the line 2—2 of Figure 1 showing one of the stops for limiting pivotal movement of the blade on the tubular wiper arm.

Figure 3 is a cross sectional view taken on the line 3—3 of Figure 1 showing one of the hinges for pivotally mounting the blade on the arm.

Figure 4 is a cross sectional view taken on the line 4—4 of Figure 1 showing the perforations in the tubular arm and grooves in the blade back for discharging washing fluid in front of the blade.

Figure 5 is a cross sectional view taken on the line 5—5 of Figure 1 showing the clamp for securing the tubular arm to the conventional leaf spring and hub member of the windshield wiper and showing the supply pipe for the tubular arm secured to the tubular arm by the clamp.

Figure 6 is a longitudinal sectional view of a pump for feeding washing fluid under pressure to the tubular arm.

Referring now to the drawing in which like characters of reference designate similar parts in the various views, 10 designates a windshield, 11 the instrument board, 12 the dash of a motor vehicle, these parts being conventional. In carrying out the invention a tubular member 13 forming a spray tube, is mounted on the back 14 of a flexible windshield wiper blade 15 through the medium of spaced hinges 16 preferably formed of strap metal which loosely embraces the tubular arm and are secured in any preferred manner to the metal back 14.

The tubular member is provided with a longitudinal row of minute openings 17 which register with grooves 18 and 19 formed in the metal back 14, according to the angular relation of the blade to the tube to always discharge cleaning fluid in front of the blade as it is oscillated.

A leaf spring 20 is terminally secured to the blade through the medium of a strap bracket 21, best shown in Figure 5. The blade may be secured rigidly to the bracket 21 through the medium of a block of solder 22. The leaf spring is connected to the usual hub 23 which is oscillated to swing the windshield wiper transversely of the windshield 10.

Pivotal movement of the blade 15 relatively to the tubular member 13, is limited through the medium of spaced stops 24 of curved contour fixed at the bight in any preferred manner to the tubular member and having the diverging sides provided with inturned tips 25 against which the back 14 of the wiper blade abuts at either limit of pivotal movement. The stops are so disposed as to halt pivotal movement of the wiper blade in such position that the discharge openings 17 of the tubular member will always be in front of the blade as it oscillates in either direction.

A supply pipe 26 is connected to the tubular member 13 midway between the ends thereof and is secured in place by the before mentioned strap bracket 21. A flexible coupling 27, such as a short length of hose connects the supply pipe with an outlet pipe 28 which leads from a container 29 for washing material of any desired type. The pipe 28 is provided with a valve 30 which is controlled from the instrument board 11 through the medium of a push rod 31. Pressure is maintained on top of the washing liquid through the medium of a conventional pump 32 having a pulley 33 which may be connected to the fan pulley through the medium of a belt 55 drive, the pump having a valve controlled air pipe 34 which communicates with the top of the container 29.

A modified form of pump is shown in Figure 6 in which the pump housing 35 is provided with a piston 36 the rod 37 of which projects through the instrument board 38. The pump is secured to the dash through the medium of a bracket 39. A cross arm 40 is secured to the piston rod between the dash and the instrument board and a plurality of helical springs 41 are connected to the cross arm and to the end of the pump housing 35.

When the piston rod is pulled outwardly a charge of cleaning liquid is drawn into the pump housing from a reservoir 42 which is connected to the pump housing through the medium of a pipe 43 having a check valve 44 therein. A pipe 45 is connected to the pump housing and is conducted to the supply pipe of the tubular arm as heretofore described. The pipe 45 is also provided with a check valve 46 which opens oppositely to the check valve 44. After a charge of the cleaning fluid has been drawn from the container 42 into the pump cylinder the springs 41 retract and move the piston to force the cleaning liquid out of the pump cylinder into the pipe 45 and to the tubular member of the windshield wiper.

Since the operation has been described as the description of the parts progressed it is thought that the invention will be fully understood without further explanation.

What is claimed is:

The combination with an oscillatory windshield wiper including a flexible blade and a rigid back, of a tubular member sealed at the ends and formed with a plurality of fluid discharge apertures adjacent said back, there being grooves in the sides of the back adapted to register with said openings for permitting cleaning fluid to be delivered in front of the blade while moving in either direction of the oscillatory movement of the windshield wiper, pivotal connections between the back and the tubular member, stops carried by the tubular member for limiting pivotal movement of the blade with respect to the tubular member, and means for delivering cleaning fluid under pressure to the tubular member.

FLOYD L. LONGWELL.
RAYMOND E. NEBELUNG.